(12) United States Patent
Tsai et al.

(10) Patent No.: US 10,949,984 B2
(45) Date of Patent: Mar. 16, 2021

(54) OBJECT TRACKING SYSTEM AND METHOD THEREOF

(71) Applicant: National Central University, Taoyuan (TW)

(72) Inventors: Tsung-Han Tsai, Taoyuan (TW); Ching-Chin Yang, Kaohsiung (TW); Rui-Zhi Wang, Tainan (TW)

(73) Assignee: National Central University, Taoyuan (TW)

( * ) Notice: Subject to any disclaimer, the term of this patent is extended or adjusted under 35 U.S.C. 154(b) by 242 days.

(21) Appl. No.: 16/241,613

(22) Filed: Jan. 7, 2019

(65) Prior Publication Data

US 2019/0370984 A1 Dec. 5, 2019

(30) Foreign Application Priority Data

May 31, 2018 (TW) .................................. 107118678

(51) Int. Cl.
*G06T 7/254* (2017.01)
*G06T 7/194* (2017.01)
(Continued)

(52) U.S. Cl.
CPC .......... *G06T 7/254* (2017.01); *G06K 9/00503* (2013.01); *G06T 5/002* (2013.01);
(Continued)

(58) Field of Classification Search
CPC ........... G06T 7/254; G06T 7/194; G06T 5/50; G06T 5/002; G06T 7/13;
(Continued)

(56) References Cited

U.S. PATENT DOCUMENTS

2010/0296698 A1* 11/2010 Lien .......................... G06T 7/20
382/103
2015/0310274 A1* 10/2015 Shreve ...................... G06T 7/20
382/103
(Continued)

FOREIGN PATENT DOCUMENTS

TW 200733004 A 9/2007
TW 201537956 A 10/2015

*Primary Examiner* — Siamak Harandi
(74) *Attorney, Agent, or Firm* — Muncy, Geissler, Olds & Lowe, P.C.

(57) ABSTRACT

An object tracking system includes a foreground identifying module, an object grouping module, and an object tracking module. The foreground identifying module determines an attribute information of each pixel position of a current processing frame according to a difference between a pixel value of each pixel position of the current processing frame and that of a background model frame, so as to generate a current foreground frame. The object grouping module sets a label to each pixel position according to the attribute information of surrounding pixel positions of each pixel position, and connects adjacent pixel positions with the same label to form an object. The object tracking module determines the object being a tracked object according to whether the pixel positions corresponding to the object are at least partially overlapped with the pixel positions corresponding to the tracked object.

20 Claims, 10 Drawing Sheets

(51) Int. Cl.
*G06K 9/00* (2006.01)
*G06T 5/00* (2006.01)
*G06T 5/50* (2006.01)
*G06T 7/13* (2017.01)

(52) U.S. Cl.
CPC ............... *G06T 5/50* (2013.01); *G06T 7/13* (2017.01); *G06T 7/194* (2017.01); *G06T 2207/20224* (2013.01); *G06T 2207/30241* (2013.01)

(58) Field of Classification Search
CPC . G06T 2207/20224; G06T 2207/30241; G06T 2207/10016; G06T 2207/30196; G06T 7/246; G06K 9/00503; G06K 9/00744; G06K 9/3233; G06K 2009/3291
See application file for complete search history.

(56) References Cited

U.S. PATENT DOCUMENTS

2017/0358093 A1* 12/2017 Baltsen ................ G06K 9/6202
2017/0372498 A1* 12/2017 Ding .................... G06K 9/4604

* cited by examiner

OBJECT TRACKING SYSTEM AND METHOD THEREOF

CROSS REFERENCE TO RELATED APPLICATION

This application claims the benefits of the Taiwan Patent Application Serial Number 107118678, filed on May 31, 2018, the subject matter of which is incorporated herein by reference.

BACKGROUND OF THE INVENTION

1. Field of the Invention

The present invention relates to an image processing system and a method thereof, and more particularly to an object tracking system and a method thereof.

2. Description of Related Art

Object tracking has been a popular research subject in the field of image processing for a long time. In practical object tracking tasks, the tracking accuracy and subsequent operations are highly dependent on occlusion among different objects and appearance change of objects, making object tracking a technically challenging work. For the same reason, most existing tracking technologies are somehow incompetent. For example, the algorithm-based solutions are too complicated to be used in real-time image processing, and their use must be confined in a simple monitoring environment, leaving much room for improvement. Besides, most known tracking solutions require considerable labor in pre-processing and/or post-processing operations, such as that for building a robust background model in advance, resulting in unsatisfactory labor and time costs.

In view of this, the present invention provides an object tracking system and a method thereof for addressing the foregoing problems and being applied in any real-world environment.

SUMMARY OF THE INVENTION

One objective of the present invention is to provide an object tracking system, which comprises: a foreground identifying module, determining an attribute information of each pixel position of a current processing frame of a frame series according to a difference between a pixel value of each pixel position of the current processing frame and that of a background model frame, so as to generate a current foreground frame, wherein the attribute information is of a foreground attribute or a background attribute; an object grouping module, setting a label to each said pixel position according to the attribute information of a plurality of surrounding pixel positions of each said pixel position of the current foreground frame, and connecting a plurality of adjacent said pixel positions with the same label to form an object; and an object tracking module, determining the object is a specific object according to whether the pixel positions corresponding to the object in the current foreground frame are at least partially overlapped with the pixel positions corresponding to the specific object in a previous foreground frame of the frame series, and converting the label corresponding to the object into the label of the specific object.

Another objective of the present invention is to provide an object tracking method, which is configured to be performed by an object tracking system and comprises steps of: making a foreground identifying module determine an attribute information of each pixel position of a current processing frame according to a difference between a pixel value of each pixel position of the current processing frame and that of a background model frame, so as to generate a current foreground frame, wherein the attribute information is of a foreground attribute or a background attribute; making an object grouping module set a label to each said pixel position according to the attribute information of a plurality of surrounding pixel positions of each said pixel position, and connect a plurality of adjacent said pixel positions with the same label to form an object; and making an object tracking module determine the object is a specific object according to whether the pixel positions corresponding to the object in the current foreground frame are at least partially overlapped with the pixel positions corresponding to the specific object in a previous foreground frame, and convert the label corresponding to the object into the label of the specific object.

Other objects, advantages, and novel features of the invention will become more apparent from the following detailed description when taken in conjunction with the accompanying drawings.

DETAILED DESCRIPTION OF THE PREFERRED EMBODIMENTS

For further illustrating the means and functions by which the present invention achieves the certain objectives, the following description, in conjunction with the accompanying drawings and preferred embodiments, is set forth as below to illustrate the implement, structure, features and effects of the subject matter of the present invention. As the contents disclosed herein should be readily understood and can be implemented by a person skilled in the art, all equivalent changes or modifications which do not depart from the concept of the present invention should be encompassed by the appended claims.

In the specification and the appended claims, the term "connection" includes direct and indirect connection, and is not a limiting term. Also, the term "when . . . " means "while, before or after", and is not a limiting term. In addition, when plural effects (or elements) are such recited that they are connected with the term "or", these effects (or elements) are meant to exist separately and/or in parallel. Moreover, the ordinal numbers like "first" and "second" are just descriptive to the elements following them and do not mean or signify that the claimed elements are such numbered, that one claimed element is arranged with another claimed element in that order, and that the claimed elements are produced in that order. These ordinal numbers are only used to describe different elements or embodiments, and the present invention is not limited to these elements or embodiments.

Figure 1A:
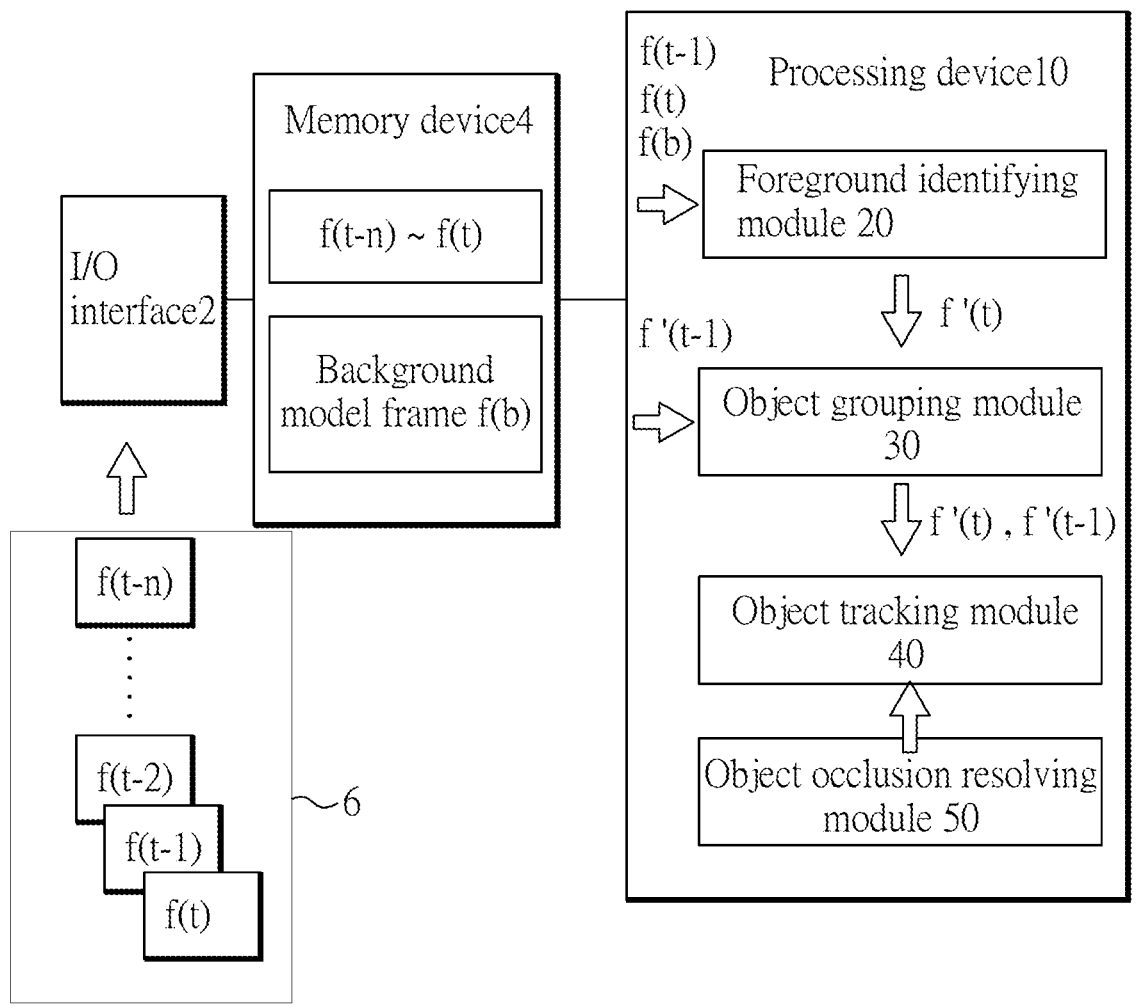
FIG. 1(A) is a block diagram of an object tracking system according to one embodiment of the present invention.

FIG. 1(A) shows an object tracking system 1 according to one embodiment of the present invention. As shown in FIG. 1(A), the object tracking system 1 comprises a foreground identifying module 20, an object grouping module 30, and an object tracking module 40. In one embodiment, the object tracking system 1 may further comprise an I/O interface 2, a memory device 4, and a processing device 10. The foreground identifying module 20, the object grouping module 30, and the object tracking module 40 may be installed in the processing device 10. The I/O interface 2 may receive a frame series 6 and output the processing result of the object tracking system 1, wherein the "processing result" may be, for example, a generated box that indicates a tracked target in the frame series, but not limited thereto. The frame series 6 may comprise a plurality of frames f(t−n) to f(t) corresponding to different time points, and each of the frames has a plurality of pixel positions, wherein f(t) is defined as a current processing frame of the object tracking system 1, and f(t−n) is defined as the n-th frame prior to the current processing frame. For instance, f(t−1) and f(t−2) may be the first and second frames before the current processing frame, respectively. In other words, f(t−n) is the first frame and f(t) is the currently last frame of the frame series 6. The memory device 4 may store the frames f(t−n) to f(t), the data processed by the object tracking system 1, or the data required by processing. The processing device 10 is configured to enable the object tracking system 1 to perform special operation. For example, the processing device 10 may process the frames f(t−n) to f(t) by using the foreground identifying module 20, the object grouping module 30 and the object tracking module 40, and output the processing result through the I/O interface 2. In one embodiment, the foreground identifying module 20 discriminates the foreground part from the background part of a frame, and then generates a thresholding foreground frame. The object grouping module 30 is configured to find out the block that may be an object in the foreground frame, and the object tracking module 40 is configured to find out a specific object (such as a tracked object) in the current frame according to object information of the previous frame, thereby tracking the object in the frame series. Additionally, in one embodiment, the processing device 10 may further comprise an object occlusion resolving module 50, so as to address any occlusion case of the object in the frame. The definition and resolution of "occlusion" will be discussed later with reference to FIG. 5.

Figure 1B:
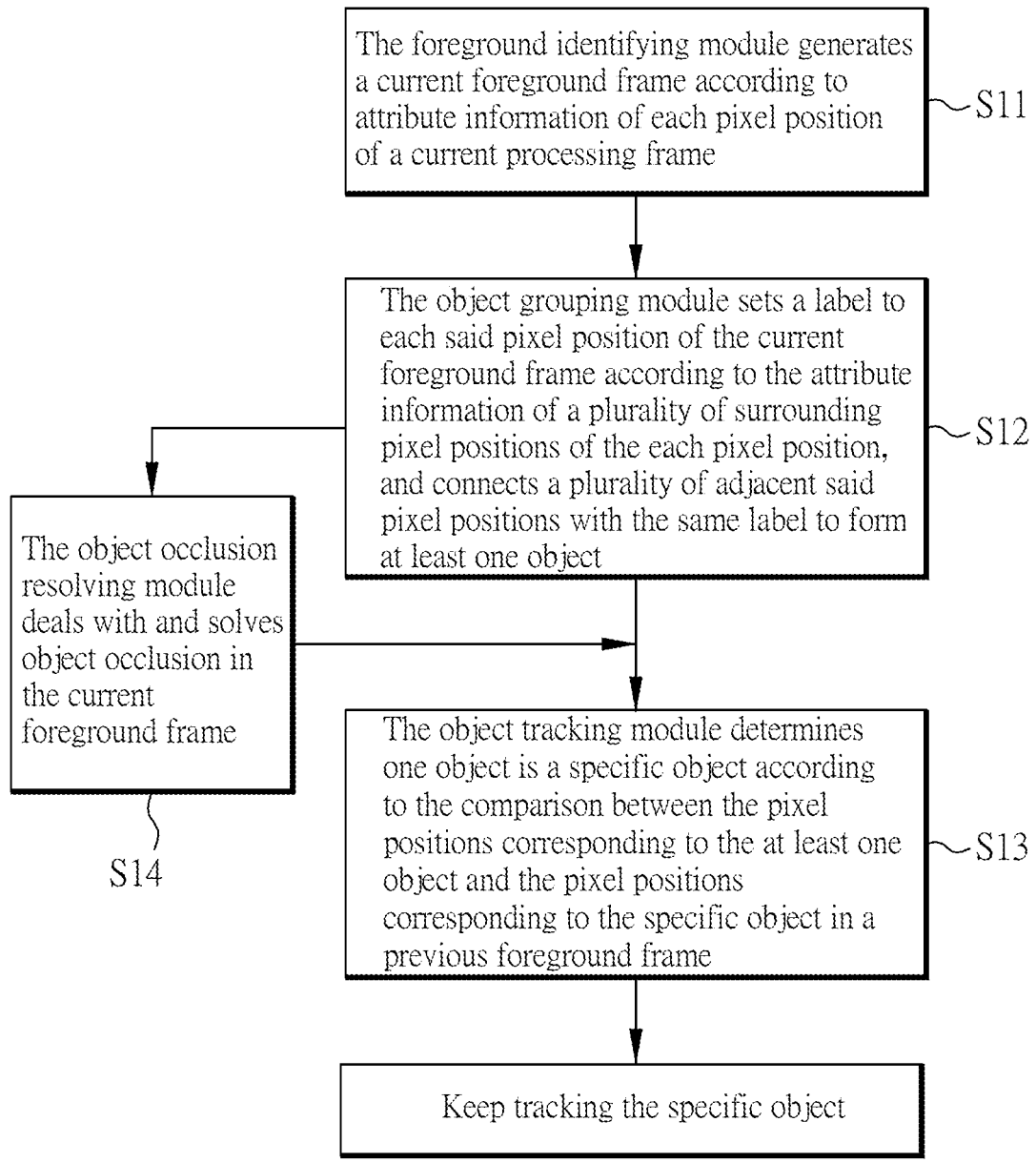
FIG. 1(B) is an overall flowchart of an object tracking method according to one embodiment of the present invention.

With the foreground identifying module 20, the object grouping module 30 and the object tracking module 40, the object tracking system 1 is able to perform an object tracking method. FIG. 1(B) is an overall flowchart of an object tracking method according to one embodiment of the present invention. Please also refer to FIG. 1(A). First, in step S11, the foreground identifying module 20 determines an attribute information of each pixel position of a current processing frame f(t) according to a difference between a pixel value of each pixel position of the current processing frame f(t) and that of a background model frame f(b), so as to generate a current foreground frame f'(t), wherein the attribute information is of a foreground attribute or a background attribute. In step S12, the object grouping module 30 sets a label to each said pixel position of the current foreground frame f'(t) according to the attribute information of a plurality of surrounding pixel positions of the each pixel position, and connects a plurality of adjacent said pixel positions with the same label to form at least one object. In step S13, the object tracking module 40 determines the at least one object is a specific object according to the comparison between the pixel positions corresponding to the at least one object and the pixel positions corresponding to the specific object in a previous foreground frame f'(t−1). Therefore, the present invention can extract the foreground part of the frame, and find out a possible object in the foreground part, so as to determine whether the object is a specific object in the immediately previous frame (such as a tracked object). The present invention involves no complicated algorithms, and thus can provide real-time processing to meet the needs of practical applications better. Additionally, the object tracking method may further comprise step S14, wherein the object occlusion resolving module 50 deals with and solves object occlusion in the current foreground frame f'(t).

Referring to FIG. 1(A) again, the object tracking system 1 may be realized in various ways. In one embodiment, the object tracking system 1 may be an image processing device, such as a computer, monitor or any electronic device having a microprocessor or a microcontroller. Alternatively, it may be an electronic circuit in an image processing device. In one embodiment, the I/O interface 2 may be realized using any device that is capable of receiving or outputting data, such as a signal input/output port of an electronic circuit, a data transmission interface of a computer, or another device having similar functions. In one embodiment, the memory device 4 may be realized using any data storing device, such as a register in an electronic circuit, a memory in a computer or a hard drive. In one embodiment, the processing device 10 may be realized in the form of a microprocessor, a microcontroller, or a controller chip. In one embodiment, the memory device 4 and the processing device 10 may be integrated as a unity. It is to be noted that the above description is merely illustrative and not intended to limit the present invention in any way.

In one embodiment, the foreground identifying module 20, the object grouping module 30, the object tracking module 40, and the object occlusion resolving module 50 may be realized in the form of hardware or software. In a case with hardware, the foreground identifying module 20, the object grouping module 30, the object tracking module 40, and the object occlusion resolving module 50 may each be an electronic circuit having specialized functions or a hardware device having special firmware. In a case with software, the foreground identifying module 20, the object grouping module 30, the object tracking module 40, and the object occlusion resolving module 50 may each be a non-transitory computer program product having program codes, so that when being loaded into a microprocessor or a microcontroller, they can enable the microprocessor or the microcontroller to perform particular operations. In this regard, they can be considered as special function modules in a microprocessor or a microcontroller. In one embodiment, the foreground identifying module 20, the object grouping module 30, the object tracking module 40, and the object occlusion resolving module 50 may each be an independent program, or they may all be sub-programs in the same program, wherein the program codes of the foreground identifying module 20, the object grouping module 30, the object tracking module 40, and the object occlusion resolving module 50 may be written in various programming languages. In one embodiment, the foreground identifying module 20, the object grouping module 30, the object tracking module 40, and the object occlusion resolving module 50 may be stored outside a processing device 10, such as stored in non-transitory computer-readable medium like a compact disk, a hard drive, or a flash drive, or stored in a cloud-based server, before installed into the processing device 10.

In one embodiment, the frame series 6 may be captured using an image-capturing device (such as a video camera) from a fixed angle of view, and then input to the object tracking system 1 through the I/O interface 2. The frames f(t−n) to f(t) forming the frame series 6 may be of various types, such as color frames, gray-scale frames or black-and-white frames. In one preferred embodiment where the frames f(t−n) to f(t) are all gray-scale frames, the frames f(t−n) to f(t) may be converted into gray-scale frames before or after input to the object tracking system 1, or the frame series 6 itself captured by the image-capturing device is gray-scale. Use of gray-scale frames f(t−n) to f(t) is beneficial for reduced complexity of image processing. For example, the object tracking system 1 of the present invention may be one without color-related functions, so as to reduce computational errors and increase computational efficiency. Additionally, the object tracking system 1 of the present invention may process real-time images captured by an image-capturing device, and may process pre-recorded frame series.

In one embodiment, the background model frame f(b) may be a background frame stored in the object tracking system 1 in advance. In one embodiment, the background model frame f(b) and the frames f(t−n) to f(t) have the same angle of view. In one embodiment, when all related requirements are met, the foreground identifying module 20 can update the background frame module f(b) so as to split the foreground more accurately.

The following description is directed to detailed operation of the foreground identifying module 20, the object grouping module 30, and the object tracking module 40. It is to be noted that, where these modules are in the form of software, their operation may be realized using a microprocessor or a microcontroller.

Figure 2A:
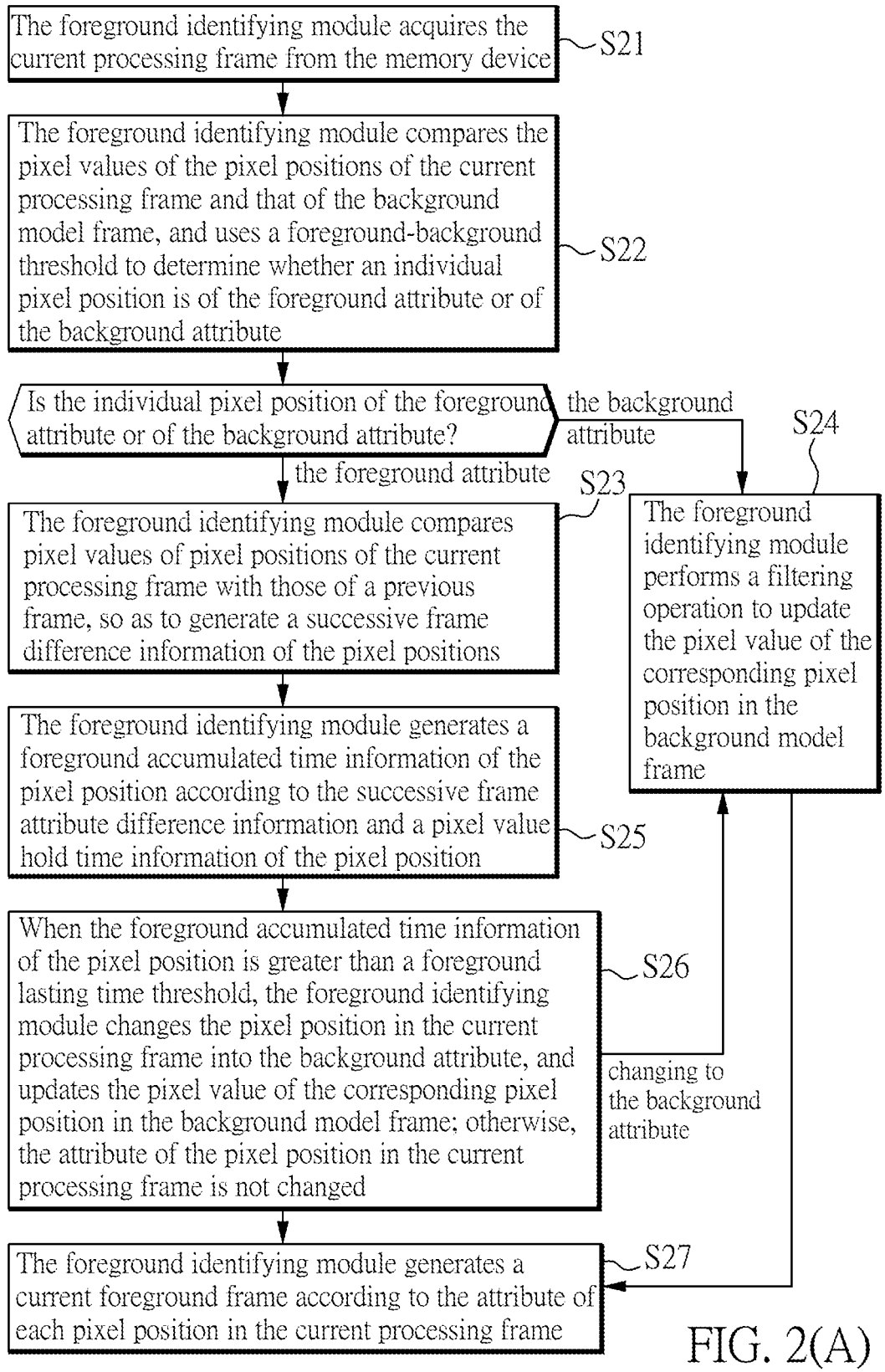
FIG. 2(A) is a detailed operational diagram of a foreground identifying module according to one embodiment of the present invention.

First, the operation of the foreground identifying module 20 is described. FIG. 2(A) is a detailed operational diagram of the foreground identifying module 20 according to one embodiment of the present invention. Please also refer to FIG. 1(A) and FIG. 1(B). As shown in FIG. 2(A), in step S21, the foreground identifying module 20 acquires the current processing frame f(t) from the memory device 4. In step S22, the foreground identifying module 20 compares the pixel values of the pixel positions of the current processing frame f(t) and that of the background model frame f(b), and uses a foreground-background threshold (Td1) to determine whether an individual pixel position is of the foreground attribute or of the background attribute. The foreground-background threshold (Td1) may be, for example, set as 15 (or any value determined experimentally), but not limited thereto. Additionally, in Step S23, the foreground identifying module 20 compares pixel values of pixel positions of the current processing frame f(t) with those of a previous frame (such as the immediately previous frame f(t−1)), so as to generate a successive frame difference information of the pixel positions. When one pixel position in the current processing frame f(t) (such as a first pixel position) is of the background attribute, the step S24 is conducted, and the foreground identifying module 20 performs a filtering operation to update the pixel value of the corresponding pixel position in the background model frame f(b). When the pixel position (i.e. the first pixel position) in the current processing frame f(t) is of the foreground attribute, in step S25, the foreground identifying module 20 generates a foreground accumulated time information of the pixel position (i.e. the first pixel position) according to the successive frame attribute difference information and a pixel value hold time information of the pixel position (such as the first pixel position). The pixel value hold time information will be further discussed below. When the foreground accumulated time information of the pixel position (such as the first pixel position) is greater than a foreground lasting time threshold (Td2), in step S26, the foreground identifying module 20 changes the pixel position (first pixel position) in the current processing frame f(t) into the background attribute, and updates the pixel value of the corresponding pixel position in the background model frame f(b). On the other hand, when the foreground accumulated time information of the pixel position (i.e. the first pixel position) is not greater than foreground lasting time threshold (Td2), the attribute of the pixel position (i.e. the first pixel position) in the current processing frame f(t) is not changed. Then, in step S27, the foreground identifying module 20 generates a current foreground frame f'(t) according to the attribute of each pixel position in the current processing frame f(t). The order of the foregoing steps is illustrative, and is not intended for limiting. For example, step S22 and step S23 may be performed in either order. The following description will be focused on step S21 to s27 in detail.

As to step S21, the current foreground frame f(t) and the background model frame f(b) may comprise plural pixel positions, each pixel position having a pixel value. In one embodiment, the pixel value may be a gray-scale value. Additionally, since the current foreground frame f(t) and the background model frame f(b) are captured from the same angle of view, the current foreground frame f(t) and the background model frame f(b) have corresponding pixel positions.

As to step S22, in one embodiment, the foreground identifying module 20 may use background subtraction to obtain the pixel value difference information between the corresponding pixel positions in the current processing frame f(t) and in the background model frame f(b), so as to determine the difference between the pixel values. Taking a gray-scale frame (whose pixel value is a gray-scale value) as an example, the greater the gray-scale value difference of a pixel position is, the more frequent the image components of the pixel position change, meaning that the pixel position of the current processing frame f(t) is more unlikely to be of the background attribute. In this way, the pixel positions can be roughly classified in terms of attribute. In one embodiment, the foreground identifying module 20 may further perform a smoothing operation on the pixel value difference, so as to filter off minor noise from the foreground. In one embodiment, the foreground identifying module 20 performs the smoothing operation using a Gaussian smoothing matrix. In this case, the operation of step S22 may be represented by the following equation, wherein the pixel positions of the current processing frame f(t) and the background model frame f(b) are expressed in the form of XY coordinates:

$$F_{sb}(x, y) = \sum_{i=-1}^{1} \sum_{j=-1}^{1} \{|B(x-i, y-j) - F(x-i, y-j)| * G_{3\times 3}(i+1, j+1)\};$$

$$G_{3\times 3}(i+1, j+1) = \begin{bmatrix} 1 & 4 & 1 \\ 4 & 16 & 4 \\ 1 & 4 & 1 \end{bmatrix};$$

$$F_b(x, y) = \begin{cases} 0, & \text{if } (F_{sb}(x, y) < Td1 * 36) \\ 1, & \text{otherwise} \end{cases};$$

in which F(x,y) is the pixel value of a pixel position in the current processing frame f(t); B(x,y) is the pixel value of the corresponding pixel position in the background model frame f(b); $G_{3\times 3}(i,j)$ is the Gaussian smoothing matrix; Td1 is the foreground-background threshold; $F_{sb}(x,y)$ is the result of background subtraction and smoothing operation of the pixel value of the pixel position; and $F_b(x,y)$ is the thresholding attribute information of the pixel position, where $F_b(x,y)=0$ represents the background attribute, and $F_b(x,y)=1$ represents the foreground attribute.

As to step S23, in one embodiment, the foreground identifying module 20 may use frame differencing to obtain the pixel value difference information between the pixel positions of the current processing frame f(t) and the pixel positions in the immediately previous frame, wherein the immediately previous frame may be the immediately previous frame f(t−1) to the current processing frame f(t). In the event that the pixel value of a pixel position remains unchanged in the immediately previous frame and in the current frame, it means that the pixel position is static, and is therefore more likely to be of the background attribute. In this manner, the successive frame difference information is helpful to determine step whether the attribute information of the pixel position obtained in step S22 is correct, and to determine whether the attribute information of the corresponding pixel position in the background model frame f(b) needs to be updated. In one embodiment, the operation of step S23 may be expressed using the following equation:

$$F_{sd}(x, y) = \text{abs}(F(x, y) - F_{t-1}(x, y));$$

$$F_d(x, y) = \begin{cases} 0, & \text{if } (F_{sd}(x, y) < Td) \\ 1, & \text{otherwise} \end{cases};$$

in which $F_{t-1}(x,y)$ is the pixel value of the pixel position in the immediately previous frame f(t−1); $F_{sd}(x,y)$ is the operational result of frame differencing; $F_d(x,y)$ is the successive frame difference information of the pixel position, where $F_d(x,y)=0$ means the pixel position remains unchanged in successive frames (or that it is more likely to be a part of the background); $F_d(x,y)=1$ means the pixel position changes in successive frames (or that it is more unlikely to be a part of the background)

As to step S24, in one embodiment, where a pixel position is of the background attribute, the foreground identifying module 20 may perform filtering operation using a filter, such as an IIR (Infinite Impulse Response) filter, so that the foreground identifying module 20 can quickly update the pixel value of the corresponding pixel position in the background model frame f(b), and filter out minor changes that are actually noises. A reason for performing step S24 is that the background may also have changes over time (such as from a vacant lot to a lot having cars parked therein), so the background has to be updated timely. In one embodiment, the operation of such an IIR filter may be expressed using the following equation:

$$B_{new1}(x,y)=F_b(x,y)*B(x,y)+(1-F_b(x,y))*[(1-\alpha)*B(x,y)+\alpha*F(x,y)];$$

where $B_{new1}(x,y)$ is the updated pixel value of the corresponding pixel position in the background model frame f(b), and a is a preset parameter.

As to step S25, in one embodiment, when a pixel position is identified as of foreground attribute, for preventing misidentification, the foreground identifying module 20 may use the successive frame difference information and the pixel value hold time information of the pixel position to calculate the foreground accumulated time information of the pixel position, wherein the pixel value hold time information of the pixel position is a time period which the pixel value of the pixel position in the frame series 6 has existed for. The pixel value hold time information may be obtained through time counting, and stored in the memory device 4. In one embodiment, the pixel value hold time information may be expressed in the form of the time where the pixel value lasts in seconds, or in the form of the number of frames. In another embodiment, the pixel value hold time information may alternatively expressed in the form of a weight. For example, different time periods in seconds or different numbers of frames may correspond to different weights. When the foreground accumulated time information of the pixel position is greater than the foreground lasting time threshold (Td2), it means that the pixel value of the pixel position did not change much in the successive frames, so that this pixel position is very likely to be of the background attribute. Therefore, the foreground accumulated time information may be an auxiliary step to check step S22 for misidentification. In one embodiment, the operation of step S25 may be expressed using the following equation:

$$F_{sc2}(x, y) = \begin{cases} F_{sc}(x, y) - \dfrac{Td2}{4}, & \text{if } (F_d(x, y) = 1 \text{ or } F_b(x, y) = 0) \\ F_{sc}(x, y) + 1, & \text{otherwise} \end{cases};$$

wherein $F_{sc}(x,y)$ is the pixel value hold time information of the pixel position; $F_{sc2}(x,y)$ is the foreground accumulated time information of the pixel position; and Td2 is the foreground lasting time threshold, where Td2 is typically set as 50.

As to step S26, in one embodiment, when the foreground accumulated time information of the pixel position is greater than the foreground lasting time threshold (Td2), it means that the pixel position is very likely to be of the background attribute. Since it is likely that misidentification happened in step S22, the information of the background model frame f(b) may be outdated. Thus, it is not only that the attribute of the pixel position has to be changed into the background attribute, but also that the pixel value of the corresponding pixel position in the background model frame f(b) has to be updated. The foreground identifying module 20 may therefore update the pixel value of the corresponding pixel position in the background model frame f(b) with the pixel value of the pixel position in the current processing frame f(t) (meaning that the pixel position should be a part of the background), and then the foreground identifying module 20 may perform filtering in step S24 for the desired update. On the contrary, when the foreground accumulated time information of the pixel position is not greater than the foreground lasting time threshold (Td2), it means that the corresponding pixel position in the background model frame f(b) does not need to be updated. In one embodiment, the operation of step S26 may be expressed using the following equation:

$$B_{new2}(x, y) = \begin{cases} F(x, y), \text{ if } (F_{sc2}(x, y) > Td2) \\ B(x, y), \text{ otherwise} \end{cases};$$

wherein $B_{new2}(x,y)$ is the updated pixel value of the corresponding pixel position in the background model frame f(b), and B (x,y) is the original pixel value of the corresponding pixel position in the background model frame f(b).

As to step S27, the foreground identifying module 20 may perform thresholding on the current processing frame f(t) according to the attribute information of all the pixel positions obtained in the previous step, so as to generate the thresholding current foreground frame f'(t). In one embodiment, all the pixel positions of the background attribute in the current foreground frame f'(t) are displayed in a dark color (such as black), while all the pixel positions of the foreground attribute are displayed in a light color (such as white).

In some circumstances, the current foreground frame f'(t) generated through steps S21 to S27 may contain ghost images. For example, when a certain object stays in the same position in the frame series 6 for an excessive time period, the object may be wrongly identified as a part of the background by the foreground identifying module 20, and then when the object starts to move, image processing can generate ghost images. The present invention further provides a method to solve this problem, as shown in FIG. 2(B).

Figure 2B:
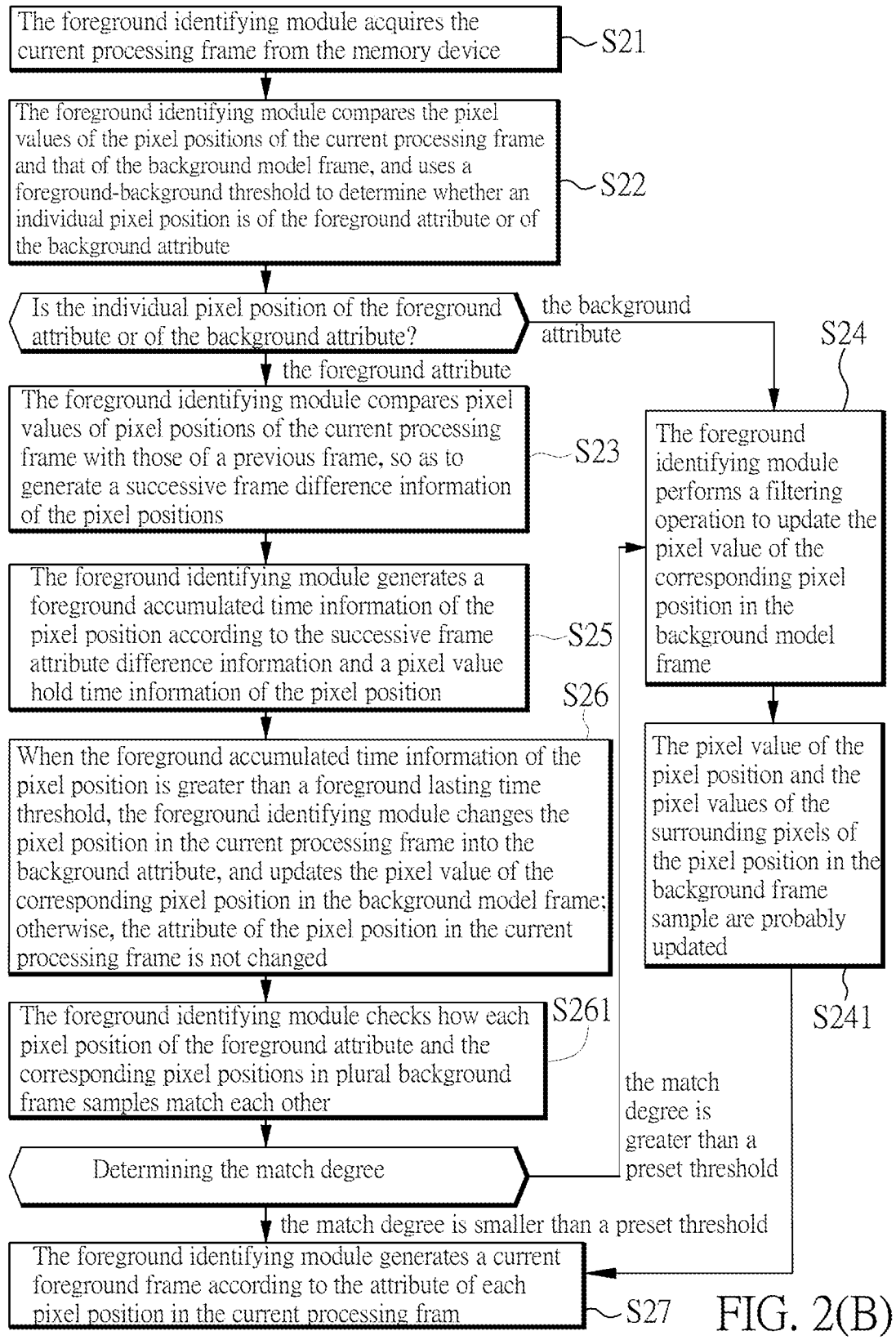
FIG. 2(B) is a detailed operational diagram of a foreground identifying module according to another embodiment of the present invention.

FIG. 2(B) is a detailed operational diagram of the foreground identifying module 20 according to another embodiment of the present invention. Please refer to FIG. 1 and FIG. 2(A) as well. The process herein is similar to that of FIG. 2(A) from step S21 to step S26, so the repeated description is omitted. The process herein features step S241 and S261.

In Step S261, the foreground identifying module 20 checks how each pixel position of the foreground attribute and the corresponding pixel positions in plural background frame samples match each other. When the match degree is greater than a preset threshold, the pixel positions of the foreground attribute are changed to being of the background attribute. Afterward, step S24 is repeated to update the pixel values of the pixel positions in the background model frame f(b). Then, in step S241, the pixel value of the pixel position and the pixel values of the surrounding pixels of the pixel position in the background frame sample are probably updated. With the operations of step S261 and step S241, ghost images can be removed from the current foreground frame f'(t). In one embodiment, the background frame samples may be stored in the memory device 4 in advance, or all the previously updated background model frames f(b) may be taken as the samples, but not limited thereto. In one embodiment, the background frame sample may be the background frames captured in different time points. In one embodiment, the number of these background frame samples is 20. In one embodiment, the probability is defined as $\Phi=16$.

Additionally, in one embodiment, the foreground identifying module 20 may use a statistic graph reflecting the differences of U and V values to remove the light and shadow changes from the current processing frame f(t) or from the current foreground frame f'(t).

The following description will be focused on the operation of the object grouping module 30. After the current foreground frame f'(t) is generated, the object grouping module 30 may identify any block that could be an object in the current foreground frame f'(t). For example, the object grouping module 30 may compose plural pixel positions into an object, and compose plural objects into an object group.

Figure 3A:
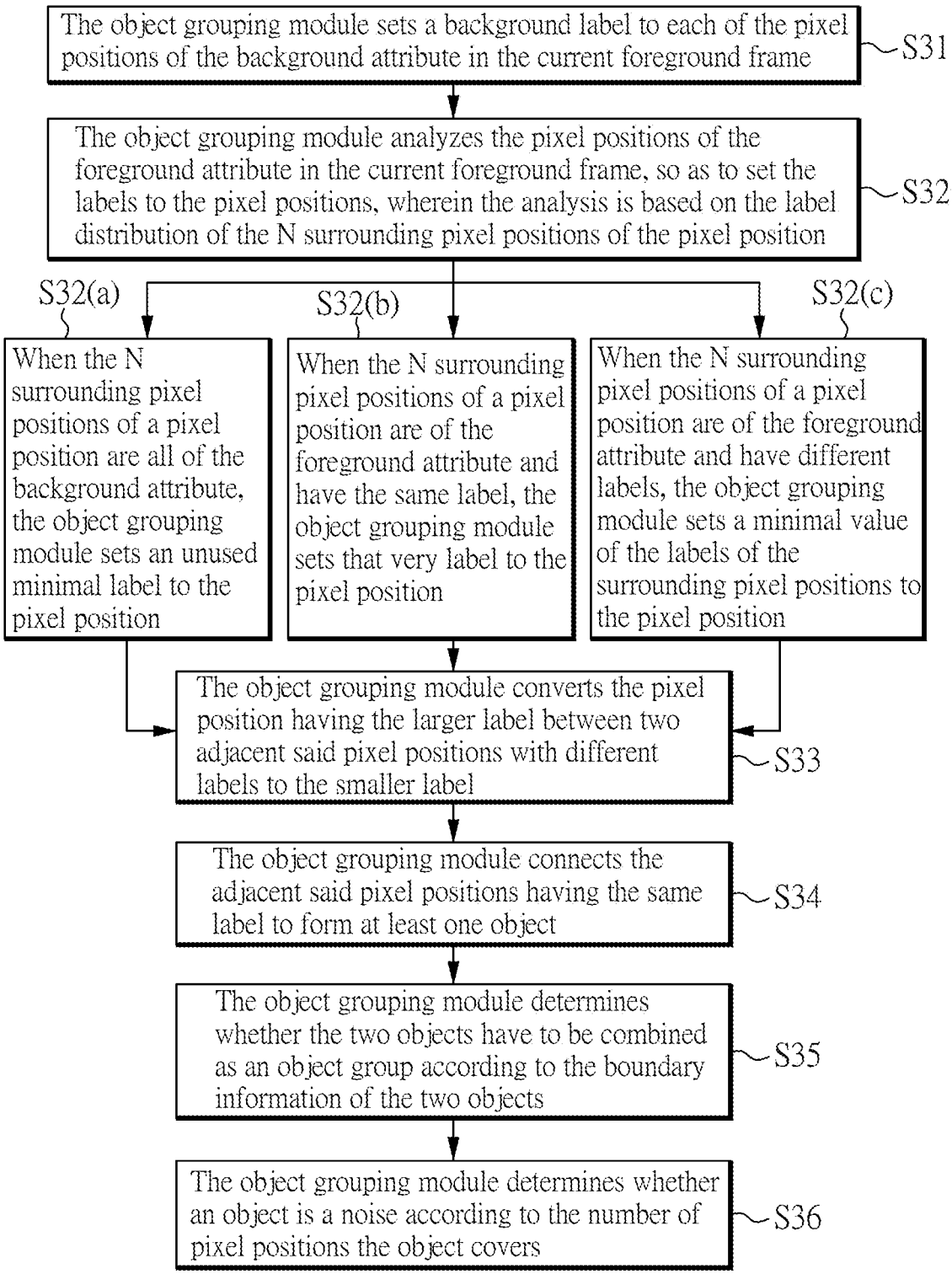
FIG. 3(A) is a detailed operational diagram of an object grouping module according to one embodiment of the present invention.

FIG. 3(A) is a detailed operational diagram of the object grouping module 30 according to one embodiment of the present invention. Please also refer to FIG. 1(A) through FIG. 2(B). In step S31, the object grouping module 30 sets a background label (such as "0") to each of the pixel positions of the background attribute in the current foreground frame f'(t). Then, in step S32, the object grouping module 30 analyzes the pixel positions of the foreground attribute in the current foreground frame f'(t), so as to set the labels to the pixel positions. The analysis is based on the label distribution of the N surrounding pixel positions of the pixel position, wherein N is a positive integer greater than zero. Additionally, the labels are values (such as "1", "2" . . . etc.) other than the background label. When the N surrounding pixel positions of a pixel position (such as the first pixel position) are all of the background attribute, step S32(a) is performed, where the object grouping module 30 sets an unused minimal label to the pixel position (i.e. the first pixel position). When the N surrounding pixel positions of a pixel position (such as the first pixel position) are of the foreground attribute and have the same label, step S32(b) is performed, where the object grouping module 30 sets the same label to the pixel position (i.e. the first pixel position). When the N surrounding pixel positions of a pixel position (such as the first pixel position) are of the foreground attribute and have different labels, step S32(c) is performed, where the object grouping module 30 sets a minimal value of the labels of the surrounding pixel positions to the pixel position (i.e. the first pixel position). After all the pixel positions have been set with a label or a background label, step S33 is performed, where the object grouping module 30 converts the pixel position having the larger label between two adjacent said pixel positions with different labels to the smaller label. After all the labels of the adjacent said pixel positions have been converted, step S34 is performed, where the object grouping module 30 connects the adjacent said pixel positions having the same label to form at least one object. In the present embodiment, N may be 4. Use of 4 pixels as the reference provides sufficient reference labels around the current pixel position CP without affecting the surrounding pixel positions that have not been set with a label. The following description will be directed to the details of step S31 through step S34 with reference to FIG. 3(B) through FIG. 3(G).

Figure 3B:
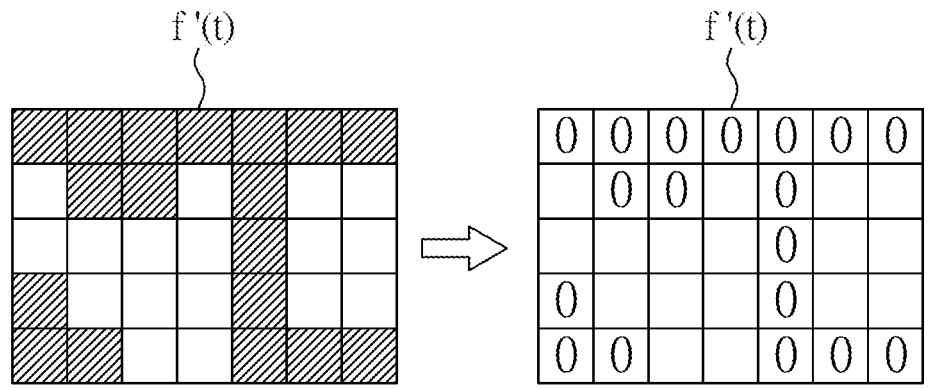
FIG. 3(B) illustrates the operation of step S31 of FIG. 3(A) according to one embodiment of the present invention.

FIG. 3(B) illustrates the operation of step S31 of FIG. 3(A) according to one embodiment of the present invention. As shown in FIG. 3(B), the current foreground frame f'(t) has pixel positions of the foreground attribute (in the light color) and pixel positions of the background attribute (in the dark color). After step S31, the pixel positions of the background attribute (in the dark color) are set with the background label (such as "0").

Figure 3C:
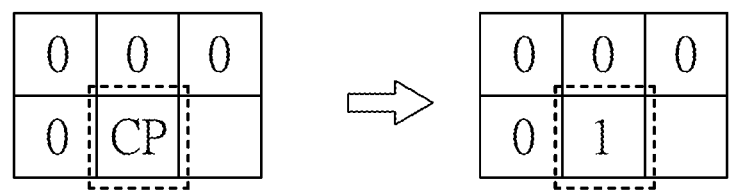
FIG. 3(C) illustrates the operation of step S32(a) of FIG. 3(A) according to one embodiment of the present invention.

FIG. 3(C) illustrates the operation of step S32(a) of FIG. 3(A) according to one embodiment of the present invention. As shown in FIG. 3(C), when 4 pixel positions around a current pixel position (CP) of the foreground attribute are all of the background attribute, the current pixel position CP is assigned with a minimal label that has not been used (such as "1").

Figure 3D:
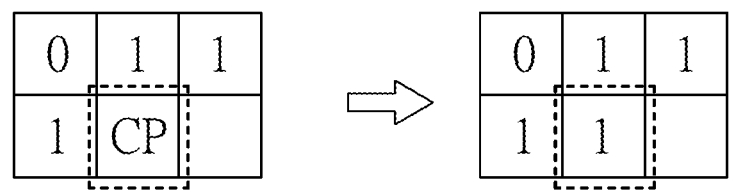
FIG. 3(D) illustrates the operation of step S32(b) of FIG. 3(A) according to one embodiment of the present invention.

FIG. 3(D) illustrates the operation of step S32(b) of FIG. 3(A) according to one embodiment of the present invention. As shown in FIG. 3(D), when the 4 pixel positions around the current pixel position (CP) are all of the foreground attribute and have the same label (such as "1"), the current pixel position (CP) is set with the same label ("1").

Figure 3E:
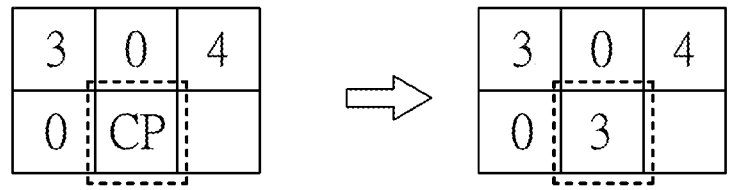
FIG. 3(E) illustrates the operation of step S32(c) of FIG. 3(A) according to one embodiment of the present invention.

FIG. 3(E) illustrates the operation of step S32(c) of FIG. 3(A) according to one embodiment of the present invention. As shown in FIG. 3(E), when the 4 pixel positions around the current pixel position (CP) are all of the foreground attribute and have different labels (such as "3" and "4"), the pixel position (CP) is set with the minimal one between/among the labels ("3").

Figure 3F:
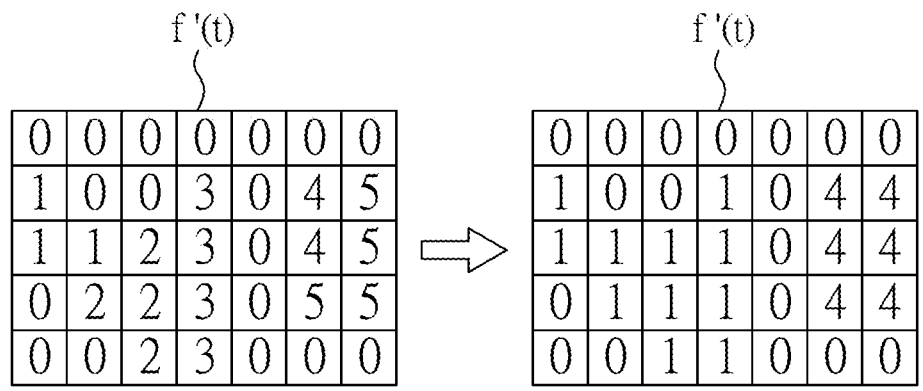
FIG. 3(F) illustrates the operation of step S33 of FIG. 3(A) according to one embodiment of the present invention.

FIG. 3(F) illustrates the operation of step S33 of FIG. 3(A) according to one embodiment of the present invention. As shown in FIG. 3(F), the adjacent different labels are converted into the same label, with the larger one being converted into the smaller one. For example, the labels "2" and "3" are converted into the label "1", and the label "5" is converted into the label "4".

Figure 3G:
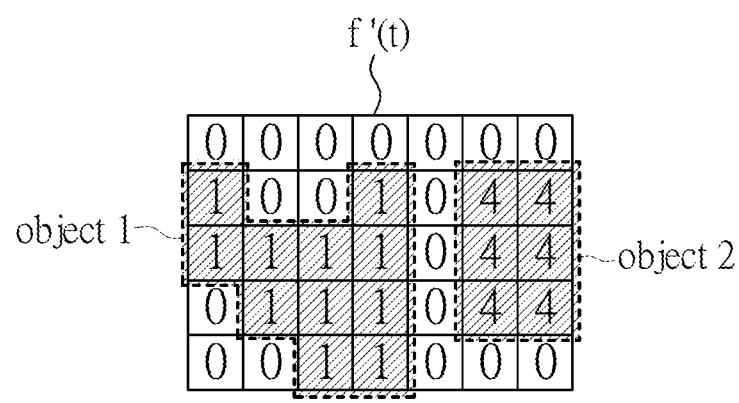
FIG. 3(G) illustrates the operation of step S34 of FIG. 3(A) according to one embodiment of the present invention.

FIG. 3(G) illustrates the operation of step S34 of FIG. 3(A) according to one embodiment of the present invention. As shown in FIG. 3(G), the adjacent labels (at this time being of the same value) are connected to form at least one object (such as Object 1 and Object 2). Thereby, the object grouping module 30 can identify possible objects (such as Object 1 and Object 2) in the current foreground frame f'(t).

Figure 3H:
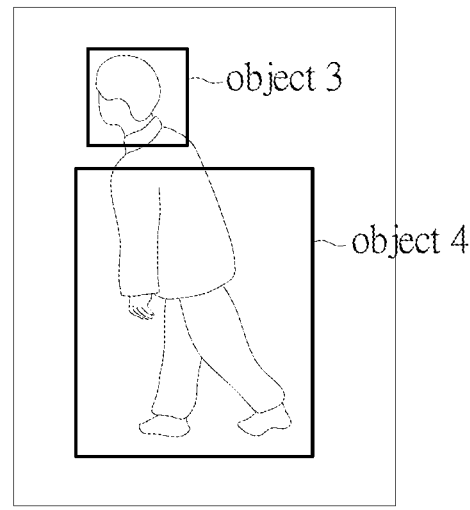
FIGS. 3(H) to 3(J) illustrate the operation of step S35 of FIG. 3(A) according to one embodiment of the present invention.
Figure 3I:
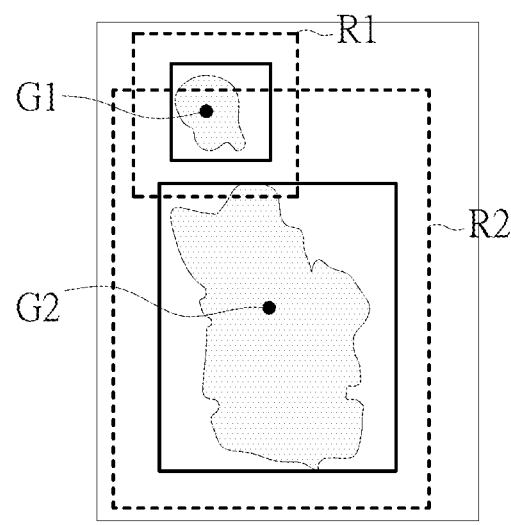
Figure 3J:
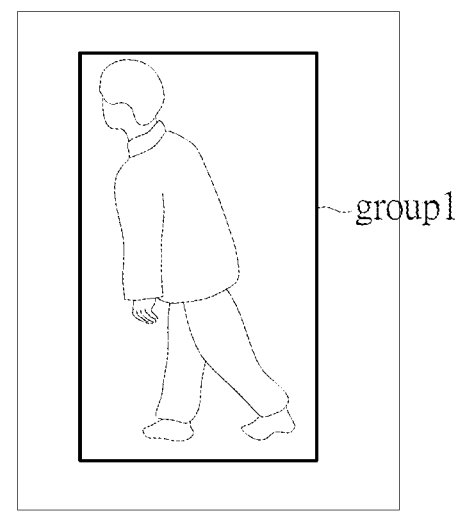

Additionally, in some circumstances, some part of an object may have a pixel value so similar to the background that it causes the object to be divided into different objects, and this can lead to false information. In one embodiment, step S35 is performed where the object grouping module 30 may determine whether the two objects have to be combined as an object group according to the boundary information of the two objects. FIGS. 3(H) to 3(J) illustrate operation of step S35 of FIG. 3(A) according to one embodiment of the present invention. As shown in FIG. 3(H), an actual object is divided into two objects (such as Object 3 and Object 4) by the object grouping module 30 through steps S31 to S34. Afterward, as shown in FIG. 3(I), the object grouping module 30 may first find out the center-of-gravity points of the objects (such as G1 and G2), and extends outward by a proportional extent against the boundaries of the objects so as to form two search ranges (such as R1 and R2). Afterward, as shown in FIG. 3(J), the object grouping module 30 determines whether there is a center-of-gravity point of any other object in the search range. If yes, the two objects are combined as one object group. In FIG. 3(J), since the search range R2 covers the center-of-gravity points G1 and G2, the two objects are combined into one object group (group1). In one preferred embodiment, the preset proportional extent may be 0.75, but not limited thereto. Step S35 helps to solve the problem about mis-division of the object.

Additionally, some small objects may actually be noises. Thus, in one embodiment, step S36 is performed, where the object grouping module 30 may determine whether an object is a noise according to the number of pixel positions the object covers. Assuming that the threshold is set as 3, all the objects covering fewer than 3 pixel positions are determined as noises and discarded.

After the object is identified in the current foreground frame f'(t), the object tracking module 40 may perform object tracking to the current foreground frame f'(t). Particularly, it tries to find out a specific object or a specific object group of the previous frame in the current foreground frame f'(t), so as to achieve object tracking. The description below will be focused on how the object tracking module 40 performs object tracking on the current foreground frame f'(t). While the specific object may actually be an object or an object group, the following description is made with the term "object" for simplicity.

Figure 4:
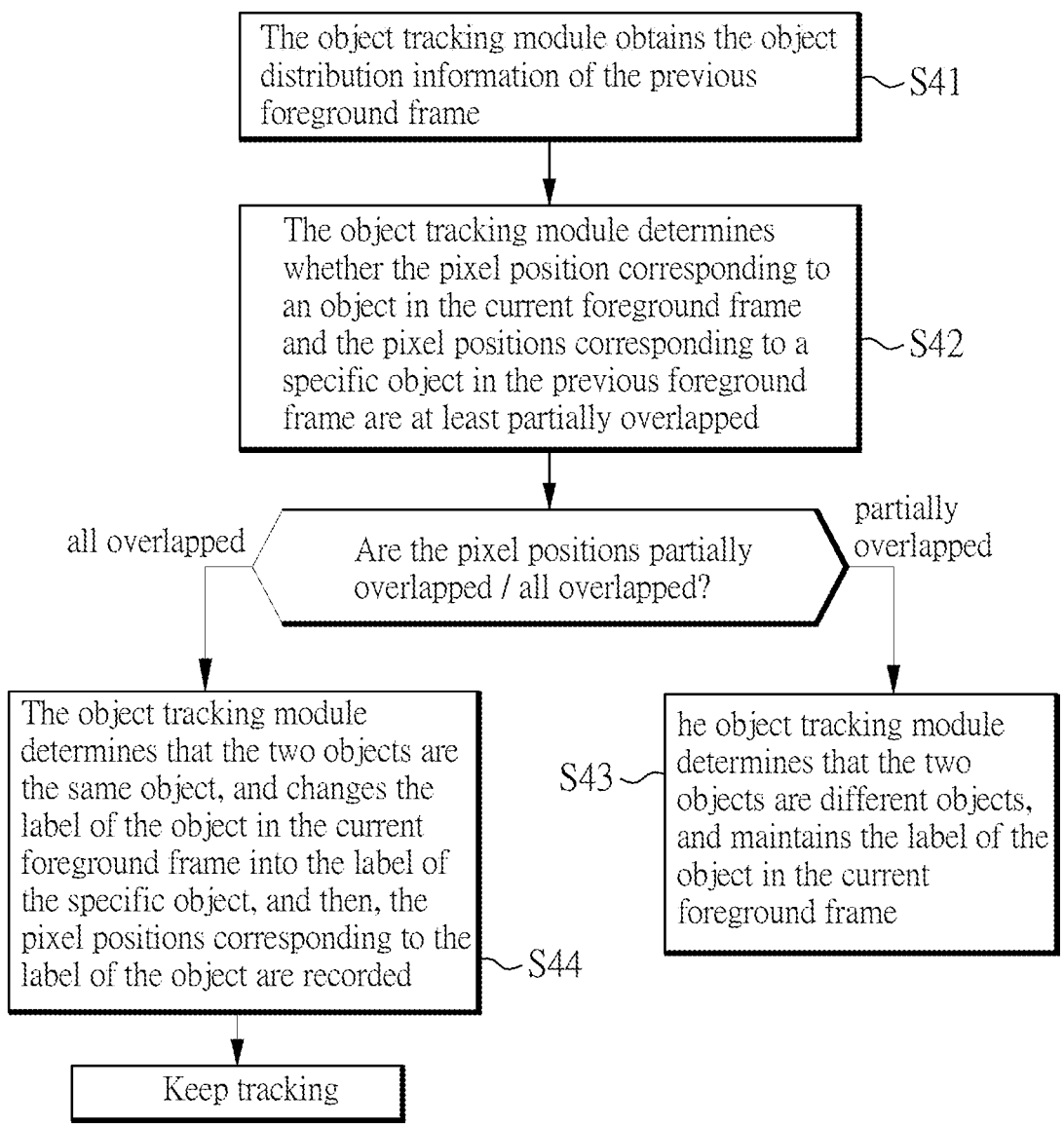
FIG. 4 is an operational diagram of an object tracking module according to one embodiment of the present invention.

FIG. 4 is an operational diagram of the object tracking module 40 according to one embodiment of the present invention. Please also refer to FIG. 1 through FIG. 4. With reference to FIG. 4, in step S41, the object tracking module 40 obtains the object distribution information of the previous foreground frame (such as f'(t−1)). Then, in step S42, the object tracking module 40 determines whether the pixel position corresponding to an object in the current foreground frame f'(t) and the pixel positions corresponding to a specific object (i.e. the tracked object) in the previous foreground frame f'(t−1) are at least partially overlapped. If they are not overlapped, step S43 is performed, where the object tracking module 40 determines that the two objects are different objects, and maintains the label of the object in the current foreground frame f'(t). If they are overlapped, step S44 is performed, where the object tracking module 40 determines that the two objects are the same object, and changes the label of the object in the current foreground frame f'(t) into the label of the specific object. The pixel positions corresponding to the label of the object are recorded (such as being stored in the memory device 4). By continuously performing step S41 through step S44, the specific object in the previous frame can be identified in the subsequent frame, so as to achieve tracking of a specific object (or a specific object group) in the frame series 6.

As to step S41, in one embodiment, the object distribution information (such as the label of the specific object and the pixel positions corresponding to the specific object) of each foreground frame after the object tracking processing (i.e. Steps S41 to S44) can be stored in the memory device 4. Thus, at the moment of processing the current foreground frame f'(t), the memory device 4 already has the object distribution information of the previous foreground frames f'(t−n) to f'(t−1). In another embodiment, the object tracking system 1 may alternatively keep the object distribution information of the immediately previous foreground frame f'(t−1) of the current foreground frame f'(t) only for saving storage space. Additionally, to the first foreground frame f'(t−n) in the frame series 6, there is no previous foreground frames. Thus, in one embodiment, the object tracking system 1 does not perform object tracking on the first foreground frame f'(t−n). Instead, after the object or object group is identified in the first foreground frame f'(t−n), the identified object or object group is set as the tracking target, or an object or object group is designated as the tracking target by a user.

As to steps S42 to S44, since it is known that an object usually does not have large displacement in immediately successive frames, once the pixel positions corresponding to two objects in successive frames are partially overlapped, it is very likely that the two objects are actually the same object having small displacement in the successive frames, so that the process of steps S42 to S44 can be used to determine whether the object in the current foreground frame f'(t) is a specific object (the tracked object) in the immediately previous foreground frame f'(t−1). Additionally, in one embodiment, the specific object from the immediately previous foreground frame f'(t−1) may be split into two separate objects in the current foreground frame f'(t). In this case, as long as the pixel position corresponding to the two split objects are all partially overlapped with the pixel positions corresponding to the specific object, the two split objects can also be converted into the label of the specific object and considered as the specific object. Therefore, tracking of the specific object can be continued even if it is split.

Figure 5:
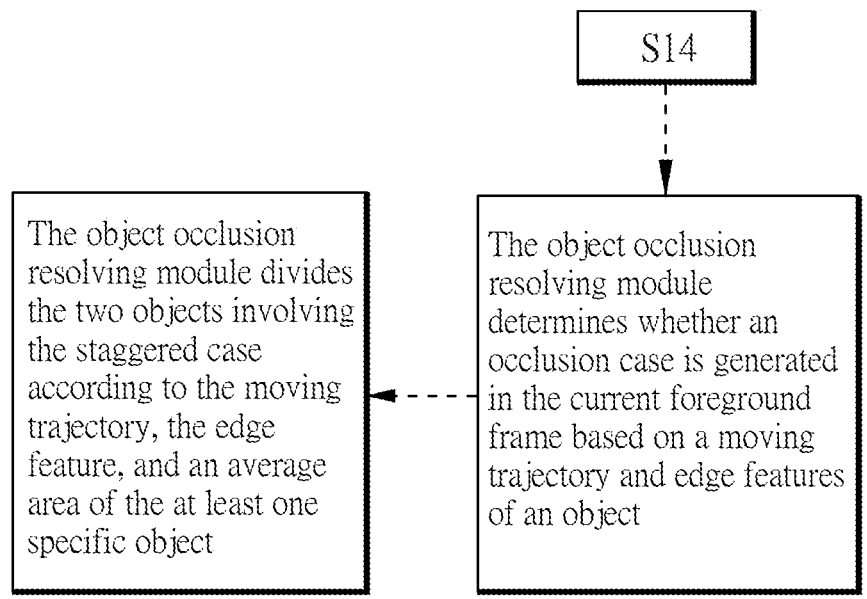
FIG. 5 is an operational diagram of an object occlusion resolving module according to one embodiment of the present invention.

Additionally, during tracking, the objects may have occlusion (occlusion cases). As used herein, the term "occlusion" includes at least three cases namely a "staggered case", a "separation case" and a "multi objects in single label case". A "staggered case" refers to a situation where two objects are staggered with each other. A "separation case" refers to a situation where an object or two staggered objects are split. A "multi objects in single label case" refers to a situation where multiple different objects are so close to each other that they are wrongly identified as the same object. Any of these cases can lead to false results of the object tracking system 1. As a solution to occlusion, the object tracking system 1 may further comprise an object occlusion resolving module 50. FIG. 5 is an operational diagram of the object occlusion resolving module 50 according to one embodiment of the present invention.

The object occlusion resolving module 50 solves occlusion-related problems based on a moving trajectory and edge features of an object. In one embodiment, the object occlusion resolving module 50 uses the memory device 4 to record the center point of a specific object in the last 50 foreground frames, and finds out the most recent turning point in the moving trajectory of the specific object according to each of the center-point positions. Afterward, it uses the turning point and the center-point position in the last frame (such as the current foreground frame) to calculate the moving speed of the specific object, and in turn figures out the center-point position of the specific object in the next frame, thereby obtaining the vector of the moving trajectory of the specific object. In one embodiment, the object occlusion resolving module 50 may analyze edges of the specific object and get an edge information of the specific object.

In one embodiment, when there is a staggered case in the current foreground frame, the object grouping module 30 may combine the two different objects into the same object group. At this time, the object occlusion resolving module 50 may search in the blocks formed by the pixel positions corresponding to the object group. Assuming that the blocks cover the center-of-gravity points of two objects, the object occlusion resolving module 50 determines that the object groups are staggered. In the event of a staggered case, the object occlusion resolving module 50 divides the at least two objects involving the staggered case in the current foreground frame according to the moving trajectory, the edge feature, and an average area of the at least one specific object in the frame series 6.

In one embodiment, the object occlusion resolving module 50 solves a separation case by analyzing the edge features and evaluating the possibility. Once the possibility of separation reaches a predetermined level, the single object is split into two objects. In the case where the original object has two labels, the positions of the labels are considered. In the case where the original object has a single label, the separation is performed and the split objects are assigned with new labels.

In one embodiment, the object occlusion resolving module 50 solves the multi objects in single label case by performing a match in the frame based on a length-width information of a specific object (such as the tracked object), and figuring out the most possible number and coordinates of the objects in the label block using edge feature analysis and foreground coverage, so as to separate the multiple objects in a single label. After separating multiple objects, the process for solving a staggered case is performed.

In one embodiment, for a frame series having a resolution of 1080p, the disclosed object tracking system 1 or object tracking method can provide an operational efficiency of more than 25 fps, i.e. 25 frames processed per second, which is much more efficient than human sensing.

As a result, the disclosed object tracking system 1 or object tracking method is capable of improving the existing object tracking technology by enhancing accuracy, allowing real-time computation, lowering operational complexity, and speeding up tracking, thus meeting practical needs that the prior art cannot achieve.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. An object tracking system, comprising:
   a foreground identifying module, determining an attribute information of each pixel position of a current processing frame of a frame series according to a difference between a pixel value of each pixel position of the current processing frame and that of a background model frame, so as to generate a current foreground frame, wherein the attribute information is of a foreground attribute or a background attribute;
   an object grouping module, setting a label to each said pixel position according to the attribute information of a plurality of surrounding pixel positions of each said pixel position, and connecting a plurality of adjacent said pixel positions with the same label to form at least one object; and
   an object tracking module, determining the at least one object being a specific object according to whether the pixel positions corresponding to the at least one object in the current foreground frame are at least partially overlapped with the pixel positions corresponding to the specific object in a previous foreground frame of the frame series, and converting the label corresponding to the at least one object into the label of the specific object.

2. The object tracking system according to claim 1, wherein the foreground identifying module further uses a Gaussian smoothing matrix to perform a smoothing operation on the difference between the pixel value of each pixel position of the current processing frame and that of the background model frame.

3. The object tracking system according to claim 1, wherein when a pixel position of the current processing frame is of the background attribute, the foreground identifying module performs a filtering operation to update the pixel value of a corresponding pixel position of the background model frame.

4. The object tracking system according to claim 1, wherein the foreground identifying module further generates a successive frame difference information of each pixel position according to a difference between the pixel value of each pixel position of the current processing frame and that of a previous frame.

5. The object tracking system according to claim 4, wherein when a pixel position of the current processing frame is of the foreground attribute, the foreground identifying module further generates a foreground accumulated time information of the pixel position according to the successive frame difference information and a pixel value hold time information of the pixel position, and determines whether the pixel position has to be changed to the background attribute according to whether the foreground accumulated time information is greater than a foreground lasting time threshold.

6. The object tracking system according to claim 4, wherein when a pixel position of the current processing frame is of the foreground attribute, the foreground identifying module further compares the pixel value of the pixel position with those of corresponding pixel positions in a plurality of background samples, and determines whether the pixel position has to be changed to the background attribute according to whether a match degree between the pixel position and the corresponding pixel positions in the background samples is greater than a preset threshold.

7. The object tracking system according to claim 1, wherein when a pixel position in the current foreground frame is of the foreground attribute, and the plurality of surrounding pixel positions of the pixel position in the current foreground frame are all of the background attribute, the object grouping module sets a minimal label that has not been used to the pixel position; when a pixel position in the current foreground frame is of the foreground attribute, and the plurality of surrounding pixel positions of the pixel position are all of the foreground attribute and have the same label, the object grouping module sets the same label to the pixel position; when a pixel position in the current foreground frame is of the foreground attribute, and the plurality of surrounding pixel positions of the pixel position are all of the foreground attribute and have at least two different labels, the object grouping module sets a minimal one between the at least two labels to the pixel position.

8. The object tracking system according to claim 1, wherein the object grouping module further determines whether two objects have to be combined according to a boundary information of the two objects in the current foreground frame.

9. The object tracking system according to claim 1, further comprising an object occlusion resolving module, which determines whether there is object occlusion in the current foreground frame according to a moving trajectory and an edge feature of at least one specific object in the frame series.

10. The object tracking system according to claim 9, wherein the object occlusion resolving module splits at least two objects that are of a staggered case object in the current foreground frame according to the moving trajectory, the edge feature and an average area of the at least one specific object.

11. An object tracking method, which is performed by an object tracking system, comprising the steps of:

using a foreground identifying module to determine an attribute information of each pixel position of a current processing frame of a frame series according to a difference between a pixel value of each pixel position of the current processing frame and that of a background model frame, so as to generate a current foreground frame, wherein the attribute information is of a foreground attribute or a background attribute;

using an object grouping module to set a label to each said pixel position according to the attribute information of a plurality of surrounding pixel positions of each said pixel position, and connect a plurality of adjacent said pixel positions with the same label to form at least one object; and using an object tracking module to determine the at least one object being a specific object according to whether the pixel positions corresponding to the at least one object in the current foreground frame are at least partially overlapped with the pixel positions corresponding to the specific object in a previous foreground frame, and convert the label corresponding to the at least one object into the label of the specific object.

12. The object tracking method according to claim 11, further comprising the step of: enabling the foreground identifying module to use a Gaussian smoothing matrix to perform a smoothing operation on the difference between the pixel value of each pixel position of the current processing frame and that of the background model frame.

13. The object tracking method according to claim 11, further comprising the step of: when a pixel position of the current processing frame is of the background attribute, using the foreground identifying module to perform a filtering operation to update the pixel value of a corresponding pixel position of the background model frame.

14. The object tracking method according to claim 11, further comprising the step of: using the foreground identifying module to generate a successive frame difference information of each pixel position according to a difference between the pixel value of each pixel position of the current processing frame and that of a previous frame.

15. The object tracking method according to claim 14, further comprising the step of: when a pixel position of the current processing frame is of the foreground attribute, using the foreground identifying module to generate a foreground accumulated time information of the pixel position according to the successive frame difference information and a pixel value hold time information of the pixel position, and determine whether the pixel position has to be changed to the background attribute according to whether the foreground accumulated time information is greater than a foreground lasting time threshold.

16. The object tracking method according to claim 14, further comprising the step of: when a pixel position of the current processing frame is of the foreground attribute, using the foreground identifying module to compare the pixel value of the pixel position with those of corresponding pixel positions in a plurality of background samples, and determine whether the pixel position has to be changed to the background attribute according to whether a match degree between the pixel position and the corresponding pixel positions in the background samples is greater than a preset threshold.

17. The object tracking method according to claim 11, further comprising the step of: when a pixel position in the current foreground frame is of the foreground attribute, and the plurality of surrounding pixel positions of the pixel position in the current foreground frame are all of the background attribute, using the object grouping module to set a minimal label that has not been used to the pixel position; when a pixel position in the current foreground frame is of the foreground attribute, and the plurality of surrounding pixel positions of the pixel position are all of the foreground attribute and have the same label, using the object grouping module to set the same label to the pixel position; and when a pixel position in the current foreground frame is of the foreground attribute, and the plurality of surrounding pixel positions of the pixel position are all of the foreground attribute and have at least two different labels, using the object grouping module to set a minimal one between the at least two labels to the pixel position.

18. The object tracking method according to claim 11, further comprising the step of: using the object grouping module to determine whether two objects have to be combined according to a boundary information of the two objects in the current foreground frame.

19. The object tracking method according to claim 11, further comprising the step of: using an object occlusion resolving module to determine whether there is object occlusion in the current foreground frame according to a moving trajectory and an edge feature of at least one specific object in the frame series.

20. The object tracking method according to claim 19, further comprising the step of: using the object occlusion resolving module to split at least two objects that are of a staggered case object in the current foreground frame according to the moving trajectory, the edge feature and an average area of the at least one specific object.

* * * * *